Feb. 7, 1928.
A. SCHMIDT
1,658,397
CUTTING TOOL FOR TUNNELING OR MINING MACHINES
Filed Oct. 20, 1925
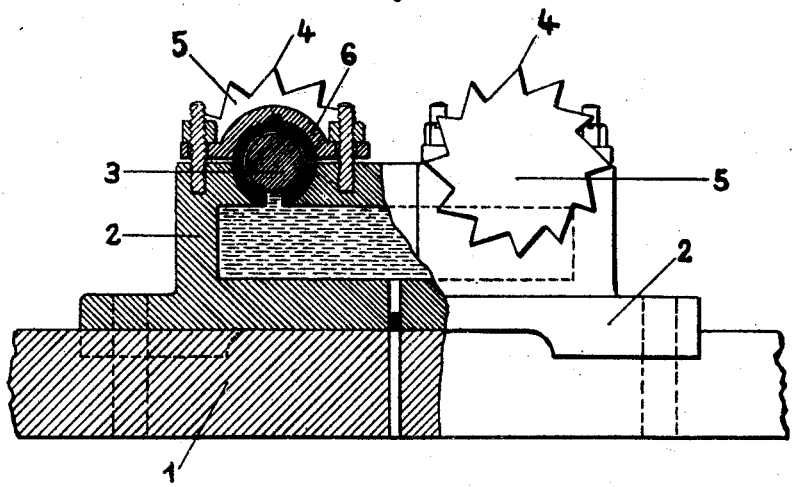
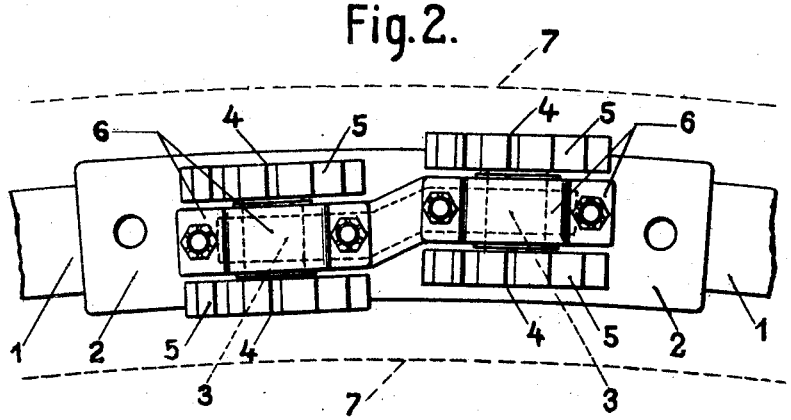

Patented Feb. 7, 1928.

1,658,397

UNITED STATES PATENT OFFICE.

ALEXANDER SCHMIDT, OF DOROG, HUNGARY.

CUTTING TOOL FOR TUNNELING OR MINING MACHINES.

Application filed October 20, 1925, Serial No. 63,729, and in Hungary July 7, 1925.

In tunneling or mining machines hitherto known the cutting tools mounted on the rotating cutter arms consisted of knives which were differently formed according as they were mounted for excavating the annular grooves or for cutting up the cores.

It was found that, however strongly these knives were constructed, the wear was such that it was frequently necessary to exchange them, and this led to a consequent interrupting of the work and loss of time.

The present invention provides a cutting tool which obviates this drawback.

The cutting tool according to the invention comprises an axle and one or more small wheels rotating with the axle. These wheels are formed with peripheral cutting teeth of irregular form and distribution. The cutting tool is carried by a tool holder mounted on a rotatable support. The wheels of the tool rotate with the excavating device of the machine and penetrating into the section to be excavated also rotate with their own axles, whereby the teeth of the wheels exert a percussive action.

The accompanying drawing represents an example of a tool according to the invention.

Fig. 1 is a view, partly in side elevation and partly in vertical section, of a tool holder equipped with two cutting tools, and the support.

Fig. 2 is a plan of Fig. 1.

The hollow block or tool holder 2, which contains within its interior a supply of lubricating oil, is secured to a support 1 and itself forms a support or bearing for two tools arranged behind one another in staggered disposition. In each bearing recess there is a bearing bush through which the oil lubrication is effected. In each bearing bush there is an axle 3 to which is rigidly connected a pair of wheels 5 provided with teeth 4, the two wheels 5 and their axle 3 forming a cutting tool.

On each tool axle 3 is provided a cover 6 which fits over the bush wherein the axle is disposed and which is secured by means of screw threaded bolts and nuts to the tool holder.

The material, form, dimensions and number of the wheels arranged on one axle can be altered according to the existing conditions. For the work of excavating and penetration it is advantageous that the tooth formation of each wheel should be unsymmetrical.

Having now particularly described and ascertained the nature of my said invention and in what manner the same is to be performed, I declare that what I claim is:—

A cutting tool for a tunneling or mining machine, comprising a hollow tool-holding block adapted to contain a supply of lubricant within its interior and provided with a pair of transverse bearings disposed in spaced, parallel relation, a rotatable support whereon said block is directly mounted, an axle rotatably mounted in each bearing; said bearings communicating with the interior of the block to permit access of the lubricant to the axles; and a pair of cutting wheels secured to the opposite ends of each axle, the wheels on one axle being staggered relatively to those on the other axle.

In testimony whereof I have signed my name to this specification.

ALEXANDER SCHMIDT.